(12) United States Patent
Kayiran et al.

(10) Patent No.: US 11,966,328 B2
(45) Date of Patent: Apr. 23, 2024

(54) NEAR-MEMORY DETERMINATION OF REGISTERS

(71) Applicant: Advanced Micro Devices, Inc., Santa Clara, CA (US)

(72) Inventors: Onur Kayiran, Fairport, NY (US); Mohamed Assem Ibrahim, Virginia, VA (US); Shaizeen Aga, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/126,977

(22) Filed: Dec. 18, 2020

(65) Prior Publication Data

US 2022/0197647 A1 Jun. 23, 2022

(51) Int. Cl.
*G06F 12/06* (2006.01)

(52) U.S. Cl.
CPC ...... *G06F 12/06* (2013.01); *G06F 2212/1041* (2013.01)

(58) Field of Classification Search
CPC .......................... G06F 12/06; G06F 2212/1041
See application file for complete search history.

(56) References Cited

U.S. PATENT DOCUMENTS

| 5,481,683 | A | * | 1/1996 | Karim | ................. | G06F 9/3836 |
| | | | | | | 712/217 |
| 5,553,264 | A | * | 9/1996 | Ozveren | ............ | G06F 12/0808 |
| | | | | | | 711/135 |

| 2001/0004758 | A1 | | 6/2001 | Park | | |
| 2010/0088550 | A1 | | 4/2010 | Imai | | |
| 2013/0339671 | A1 | * | 12/2013 | Williams, III | ........ | G06F 9/3838 |
| | | | | | | 712/E9.023 |
| 2017/0123987 | A1 | | 5/2017 | Cheng | | |
| 2017/0255397 | A1 | * | 9/2017 | Jayasena | ............. | G06F 12/0888 |
| 2019/0065082 | A1 | | 2/2019 | Penney | | |

(Continued)

OTHER PUBLICATIONS

Definition of Logic, "The American Heritage Dictionary of the English Language" <https://www.ahdictionary.com/word/search.html?q=logic> 2022 HarperCollins Publishers (Year: 2022).*

(Continued)

*Primary Examiner* — Michael Krofcheck
(74) *Attorney, Agent, or Firm* — Hickman Becker Bingham Ledesma LLP

(57) ABSTRACT

A memory module includes register selection logic to select alternate local source and/or destination registers to process PIM commands. The register selection logic uses an address-based register selection approach to select an alternate local source and/or destination register based upon address data specified by a PIM command and a split address maintained by a memory module. The register selection logic may alternatively use a register data-based approach to select an alternate local source and/or destination register based upon data stored in one or more local registers. A PIM-enabled memory module configured with the register selection logic described herein is capable of selecting an alternate local source and/or destination register to process PIM commands at or near the PIM execution unit where the PIM commands are executed.

20 Claims, 6 Drawing Sheets

(56) References Cited

U.S. PATENT DOCUMENTS

2020/0364138 A1* 11/2020 Howe ................. G06F 12/0215
2021/0056029 A1* 2/2021 Sharovar ............. G06F 12/0893

OTHER PUBLICATIONS

The International Searching Authority, "Search Report" in Application No. PCT/US2021/062215, dated Apr. 8, 2022, 9 pages.
Kepe et al., "Database Processing-in-Memory: an Experimental Study", Proceedings of the VLDB Endowment, vol. 3, No. 13, DOI: https://doi.org/10.14778/3368289.3368298, dated Nov. 2019, 14 pages.

* cited by examiner

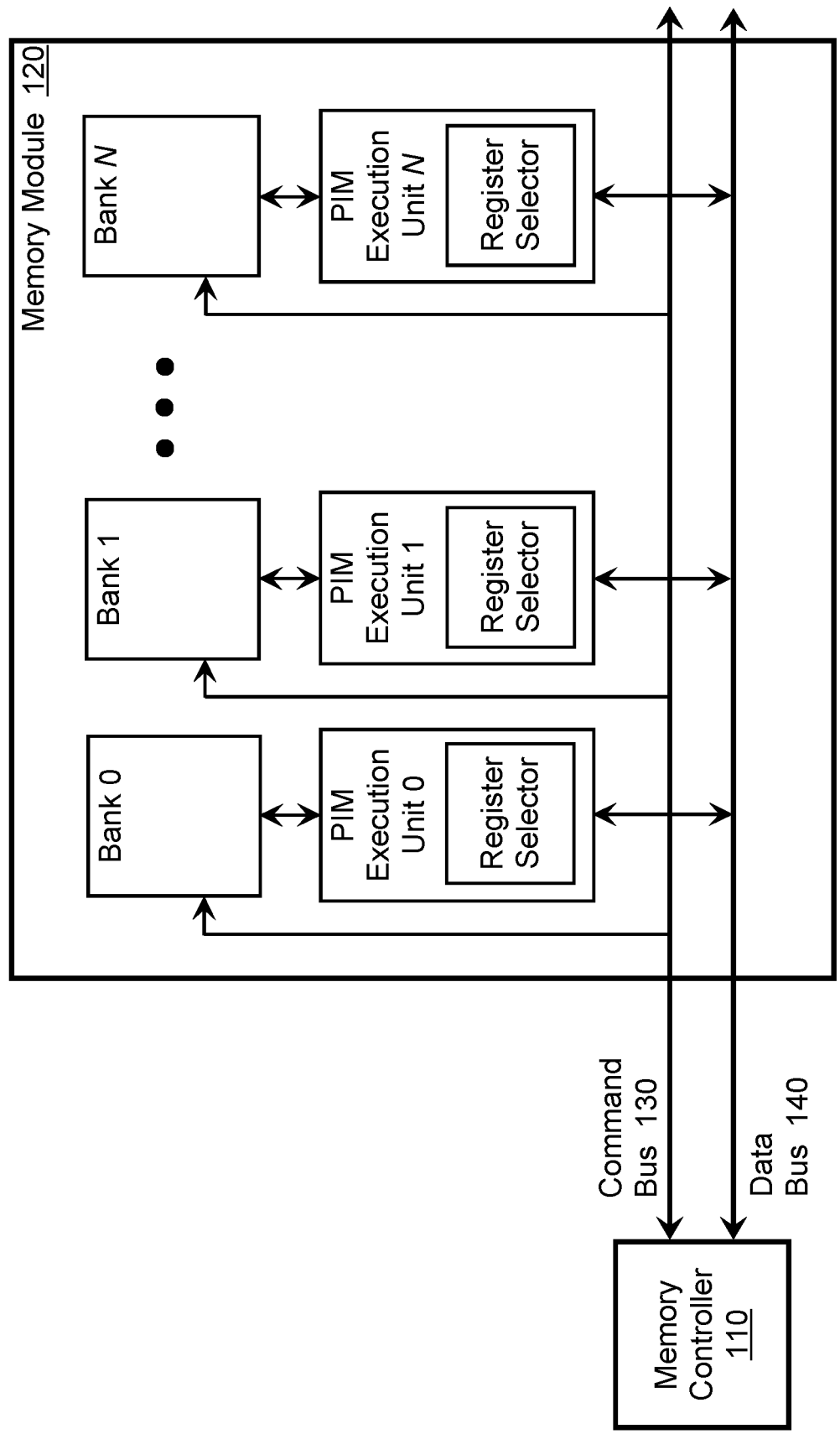

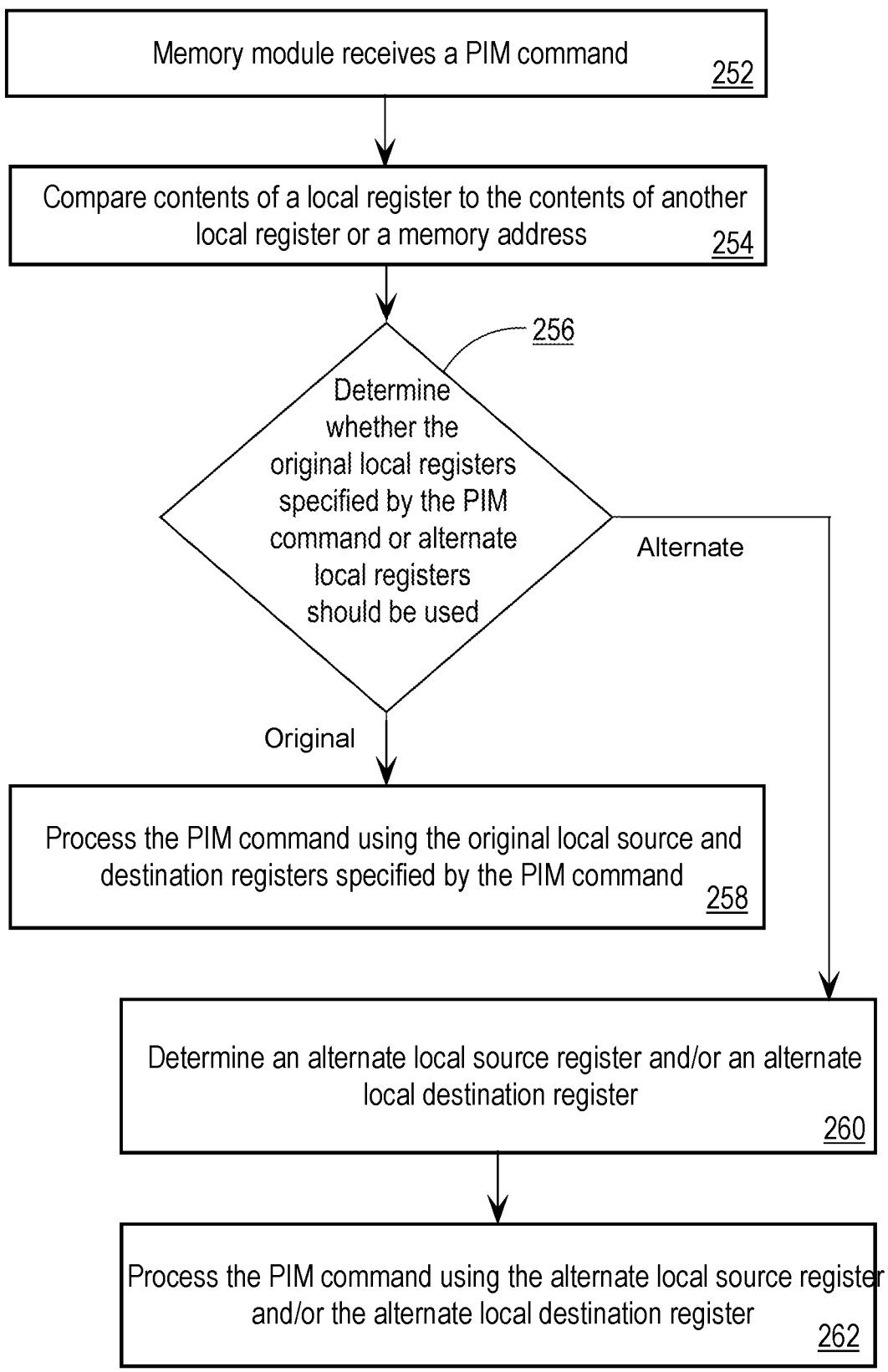

NEAR-MEMORY DETERMINATION OF REGISTERS

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

As computing throughput scales faster than memory bandwidth, various techniques have been developed to keep the growing computing capacity fed with data. Processing In Memory (PIM) incorporates processing capability within memory modules so that tasks can be processed directly within the memory modules. In the context of Dynamic Random-Access Memory (DRAM), an example PIM configuration includes vector compute elements and local registers. The vector compute elements and the local registers allow a memory module to perform some computations locally, such as arithmetic computations. This allows a memory controller to trigger local computations at multiple memory modules in parallel without requiring data movement across the memory module interface, which can greatly improve performance, particularly for data-intensive workloads.

The benefits of PIM are best realized when a memory controller issues a broadcast PIM command to multiple target banks in parallel, causing all of the target banks to execute the same instruction, using the same local registers, at the same time. This works well for regular workloads where all of the banks perform the same computation using the same local registers, but on different data. For irregular workloads however, where the computations need to use different local registers for some of the banks, the benefits of PIM are more limited because a separate set of PIM commands has to be issued to those banks, which leads to additional command cycles. One example of an irregular workload is the graphics rendering technique known as ray tracing where the data for different tree nodes could potentially be accumulated in separate registers. There is therefore a need for an approach for implementing PIM in a manner that reduces the number of PIM command cycles required for irregular workloads.

BRIEF DESCRIPTION OF THE DRAWINGS

Embodiments are depicted by way of example, and not by way of limitation, in the figures of the accompanying drawings and in which like reference numerals refer to similar elements.

FIG. 1A is a block diagram that depicts a memory arrangement.

FIG. 2B is a flow diagram that depicts an approach for using the contents of local registers in a memory module to determine whether original local registers specified by a PIM command or alternate local registers should be used to process the PIM command.

DETAILED DESCRIPTION

Figure 1B:
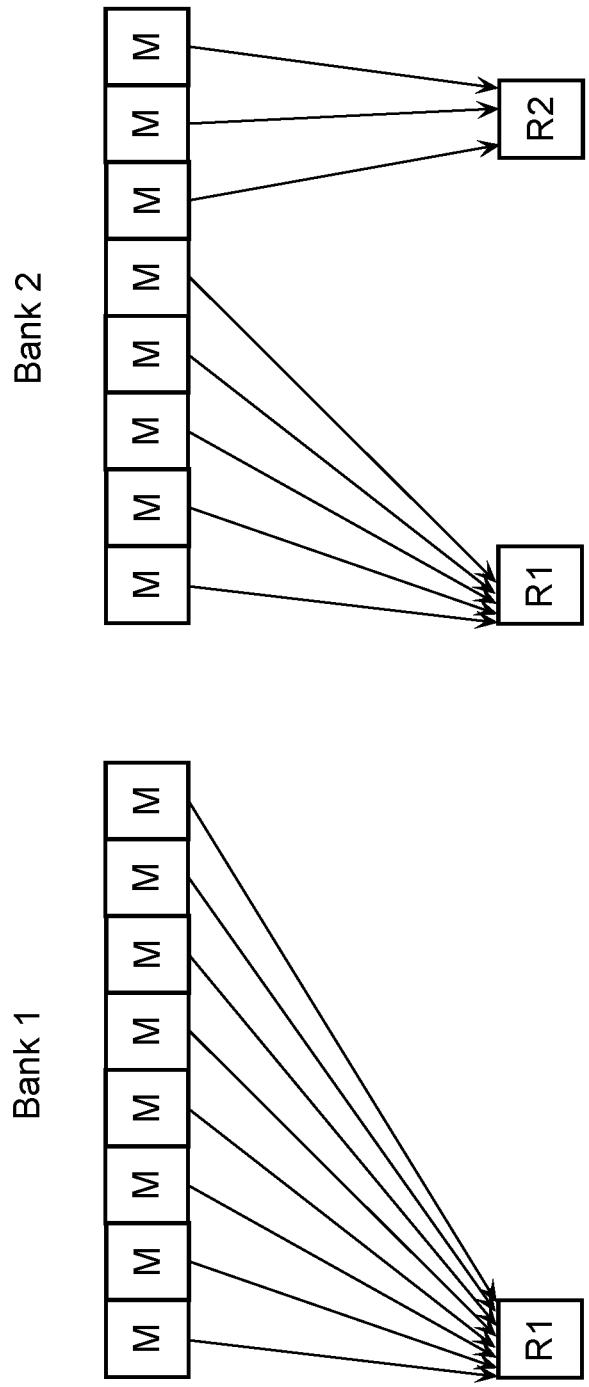
FIG. 1B depicts a high-level example of using a split address to select an alternate local register.

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. Overview
II. Architecture
III. Address-Based Register Selection
IV. Register Data-Based Register Selection

I. OVERVIEW

A memory module includes register selection logic to select alternate local source and/or destination registers to be used to process PIM commands. According to an embodiment, the register selection logic uses an address-based register selection approach to select an alternate local source and/or destination register based upon address data specified by a PIM command and a split address maintained by a memory module. According to another embodiment, the register selection logic uses a register data-based approach to select an alternate local source and/or destination register based upon data stored in one or more local registers. As used herein, the term "local register" refers to any type of local storage that is implemented in a memory module for use by a PIM execution unit in the memory module.

These embodiments are part of a technical solution described herein that addresses the technical problems associated with using PIM for irregular workloads. A PIM-enabled memory module configured with the register selection logic described herein is capable of selecting an alternate local source and/or destination register to process PIM commands at or near the PIM execution unit where the PIM commands are executed. This allows a broadcast PIM command to be processed at multiple banks in parallel, even when some banks need to use a different local source and/or local destination register. This also eliminates the need for additional PIM commands for the banks that need to use a different local source and/or local destination register, which is particularly beneficial for irregular workloads.

II. ARCHITECTURE

FIG. 1A is a block diagram that depicts a memory arrangement 100. The memory arrangement 100 includes a memory controller 110 and a memory module 120. The memory controller 110 and the memory module 120 are communicatively coupled via a command bus 130 and a data bus 140. As used herein, the term "bus" refers to any type of wired or wireless electrical coupling, such as wires, conductors, and/or wireless communications links. Embodiments are depicted in the figures and described herein in the context of a single memory module 120 for purposes of explanation, but embodiments are applicable to memory arrangements with any number of memory modules. The memory arrangement 100 may include other elements that are not depicted in the figures and described herein for purposes of explanation.

The memory controller 110 manages the flow of data going to and coming from the memory module 120 and may be implemented as a stand-alone element, for example on a separate die from a microprocessor, implemented separate from but on the same die as a microprocessor, or integrated into a microprocessor as an integrated memory controller. Embodiments are applicable to any type of memory controller 110.

The memory module 120, which may be for example a DRAM memory module, includes a memory array having N+1 banks (Bank 0-Bank N) with corresponding PIM execution units (PIM Execution Unit 0-PIM Execution Unit N). Each bank may include cells defined by a two-dimensional array, but embodiments are not limited to DRAM memory modules or banks per se, or banks with cells defined by a two-dimensional array, and are applicable to other memory cell organizations. The memory array and banks may include other elements, such as buffers and decoders, that are not depicted in the figures and described herein for purposes of explanation.

The PIM execution units include processing logic and storage, such as local registers, for processing PIM commands, e.g., to perform logical operations, arithmetic operations, etc. Although embodiments are depicted in the figures and described herein in the context of PIM-based memory modules, embodiments are not limited to this context and are applicable to non-PIM-based memory modules. According to an embodiment, the PIM execution units each include a register selector to select source and/or destination registers to be used to process PIM commands using address-based register selection or register data-based selection as described in more detail hereinafter. The register selectors may be implemented by register selection logic implemented by hardware elements and may include local storage for storing alternate registers, as described in more detail hereinafter.

III. ADDRESS-BASED REGISTER SELECTION

The address-based register selection approach generally involves selecting a source and/or a destination register based upon address data specified by a PIM command.

A. Split Addresses

A split address maintained by a memory module is used to determine whether original local registers specified by a PIM command or alternate local registers should be used to process the PIM command. According to an embodiment, address data specified by a PIM command is compared to a split address to generate a comparison result. The comparison result is used to determine whether the original local registers specified by the PIM command or an alternate source and/or destination register should be used to process the PIM command. As used herein, the term "alternate source and/or destination register" refers to a source and/or destination register that is different than the source and/or destination register specified by the PIM command.

As used herein, the term "split address" refers to a memory address and the split address may be stored anywhere in a memory module. For example, a split address may be stored in a designated local register in a PIM execution unit, in a register selector, or in a memory location in a bank. The split address may be specified via a separate command, for example by a host thread to program the memory module 120 with the split address. The split address may also be specified in a PIM command to be executed, for example, by unused parameter data. Split addresses may be programmed once, for example prior to shipping from a memory vendor. Alternatively, split addresses may be reprogrammed to allow a PIM execution unit to be programmed with an initial split address and then reprogrammed with an updated split address. Such reprogramming can also be done on a per-program basis. Embodiments are described herein in the context of using a single split address for all banks in the memory module 120, but embodiments are not limited to this example and split addresses may be bank specific. For example, a separate split address may be programmed for each bank, or a default split address may be programmed for the memory module and separate split addresses programmed for particular banks for which a different split address than the default split address is to be used. According to an embodiment described in more detail hereinafter, multiple split addresses may be used for every memory bank. While this increases the complexity of the logic implemented by the register selectors, it provides additional programming flexibility that may be beneficial for certain types of irregular workloads.

FIG. 1B depicts a high-level example of using a split address to select an alternate local register. The example of FIG. 1B includes two banks and two local registers labeled R1 and R2. Each bank includes eight memory locations that are mapped to addresses one to 16 for purposes of explanation. For a regular workload where all of the data values stored in Bank 1 and Bank 2 need to be accumulated into a single local register, i.e., R1=R1+AddrX, a host thread successively issues sixteen PIM commands of a single type, such as a broadcast command, that specifies an addition operation, a source register of R1, a destination register of R1, and a memory address. This causes all of the data values stored in both banks to be accumulated into local register R1.

For irregular workloads however, some data values may need to be accumulated into different destination registers, for example based upon the particular work being performed by a host thread. As depicted by the arrows in FIG. 1B, the values in all eight locations of Bank 1 and the first five values in Bank 2, together representing addresses 1 through 13, are accumulated into local register R1, and the last three values in Bank 2, representing addresses 14-16, are accumulated into local register R2. This requires issuing a separate PIM command to Bank 2 to accumulate the last three values into local register R2. One PIM command is issued five times to accumulate the first five values in Bank 2 into local register R1 and a different PIM command is issued three times to accumulate the last three values in Bank 2 into local register R2.

Using the address-based register selection approach with a split address eliminates the need to issue different PIM commands to accumulate the data values from Bank 2 into local registers R1 and R2. Instead, a single broadcast PIM command issued eight times may be used to accumulate the data values from both Bank 1 and Bank 2 into the local registers R1 and R2 as depicted in FIG. 1B. During the processing of each PIM command, the register selector in the PIM execution unit compares the memory address specified in the PIM command to the split address. When the memory address specified by the PIM command is less than or equal to the split address, then the original local destination register specified by the PIM command is used to process the PIM command. However, when the memory address specified by the PIM command is greater than the split address, an alternate local destination register is selected by the register selector and used to process the PIM command instead of the local destination register specified by the PIM command.

In the example depicted in FIG. 1B with a split address set to 13, the register selector for the PIM execution unit for Bank 1 uses the local register R1 specified in the PIM command as the destination register and all of the values in Bank 1 are accumulated into the local register R1 specified in the PIM command. The register selector for the PIM execution unit of Bank 2 also uses the local register R1 specified in the PIM command as the destination register to accumulate the first five values in Bank 2, since they are in addresses 9-13. But, the register selector for the PIM execution unit of Bank 2 selects local register R2 as an alternate register for accumulating the last three values in Bank 2 since these values are stored in addresses 14-16, which are all greater than the split address of 13. This results in the first 13 values from Bank 1 and Bank 2 being accumulated into local register R1 and the last three values from Bank 2 being accumulated into local register R2.

Although this example is described in the context of the comparison being made on a less than or equal to basis, embodiments are not limited to this type of comparison and other types may be used, such as less than, equal to, equal to or greater than, and greater than. Also, as described hereinafter, the register selector may select an alternate source register and/or alternate destination register based upon the result of the comparison and the source and destination registers may be dynamically selected separately.

Figure 1C:
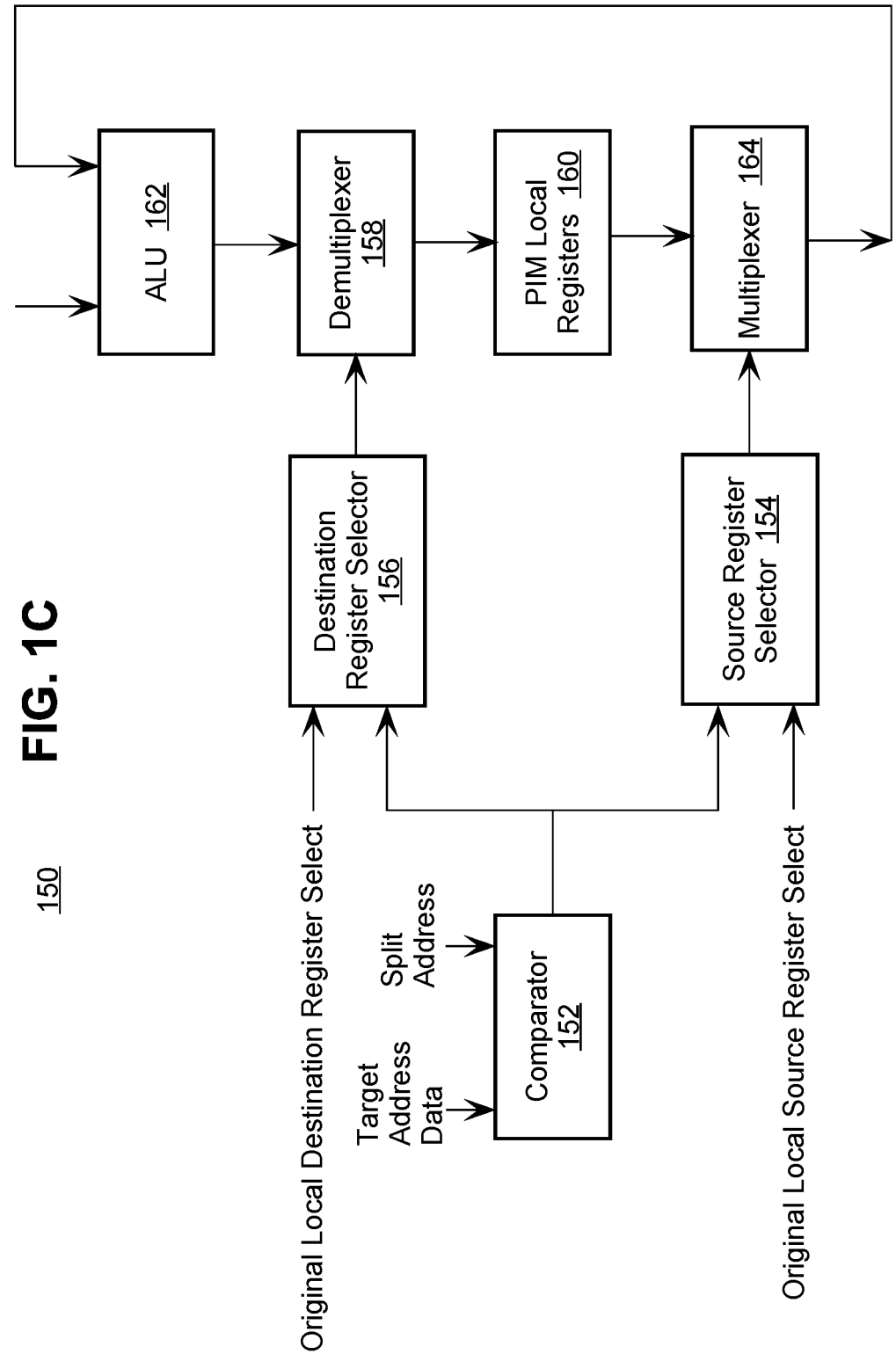
FIG. 1C depicts an example implementation of a PIM execution unit.

FIG. 1C depicts an example implementation of a PIM execution unit 150 that includes the capability to use a split address to select an alternate local source and/or destination register for a PIM command. The PIM execution unit 150 may include other elements that are not depicted in FIG. 1C or described herein for purposes of explanation.

Starting at the left side of FIG. 1C, the PIM execution unit 150 includes a comparator 152 that compares target address data from a PIM command, such as the column address from a column decoder, to a split address and generates a comparison result that is provided to both a source register selector 154 and a destination register selector 156. As previously described herein, the split address may be specific to the PIM execution unit 150 or may be common to all PIM execution units in the memory module 120. Embodiments are not limited to using the column address from a column decoder and other address information may be used.

In the situation where the comparison logic implemented by the comparator 152 is greater than, then the comparison result generated by the comparator 152 may be, for example, a logical "1" if the target address data is greater than the split address and a logical "0" if the target address data is not greater than, i.e., less than or equal to, the split address. A comparison result of "0" means that the original local register values specified in the PIM command should be used, while a comparison result of "1" means that an alternate local source and/or destination register should be used instead of the local source and/or destination register specified by the PIM command. As previously described herein, the comparator 152 is not limited to implementing greater comparison logic and may use other comparison logic, e.g., less than, less than or equal to, equal to, or greater than or equal to.

The source register selector 154 and the destination register selector 156 may be implemented by any number and type of hardware logic elements including storage elements. The source register selector 154 has as inputs the comparison result from the comparator 152 and an original local source register select that is generated by hardware elements (not depicted) based upon a source register specified in the PIM command. The source register selector 154 generates a control signal for the multiplexer 164 to select one of the PIM local registers 160 to use as a source register for the Arithmetic Logical Unit (ALU) 162.

According to an embodiment, if the comparison result from the comparator 152 does not satisfy a specified logical condition, as indicated for example by a comparison result of a logical "0," e.g., when the target address data is less than or equal to the split address, then the source register selector 154 uses the original local source register select as the source register select signal so that the multiplexer 164 selects a source PIM local register 160 that corresponds to the original local source register select. If the comparison result from the comparator 152 does satisfy the specified logical condition, as indicated for example by a comparison result of a logical "1," then the source register select signal generated by the source register selector 154 corresponds to an alternate local source register than the original local source register select.

The ALU 162 adds the memory data from the memory address specified in the PIM command to the register data from the PIM local register 160 selected by the multiplexer 164 in response to the local source register select signal from the source register selector 154 and generates a sum that is stored to a destination PIM local register 160 selected by the demultiplexer 158.

The destination register selector 156 has as inputs the comparison result from the comparator 152 and an original local destination register select that is generated by hardware elements (not depicted) based upon a destination register specified in the PIM command. The destination register selector 156 generates a control signal for the demultiplexer 158 to select one of the PIM local registers 160 to use as a local destination register to store the sum generated by the ALU 162. Similar to the source register selector 154 described above, if the comparison result from the comparator 152 does not satisfy the specified logical condition, as indicated by a comparison result of a logical "0," then the destination register selector 156 uses the original local destination register select as the destination register select signal so that the demultiplexer 158 selects a PIM local register 160 that corresponds to the original local destination register select. If the comparison result from the comparator 152 does satisfy the specified logical condition, as indicated for example by a comparison result of a logical "1," then the destination register select signal generated by the destination register selector 156 corresponds to an alternate local destination register than the original local destination register select. The particular logical values used, e.g., a logical "0" and "1," may be switched, depending upon a particular implementation.

The PIM execution unit 150 depicted in FIG. 1C includes the flexibility to select an original local source register and/or an original local destination register specified by a PIM command, or an alternate local source and/or local destination register that is different than the original local source and/or local destination register specified by the PIM command. The alternate local source and destination registers may be dynamically selected separately and in a different manner by different PIM execution units, and the approach may be used with any type of PIM command. For example, while the PIM execution unit for Bank 1 implements R1=R1+AddrX, the PIM execution unit for Bank 2 implements R2=R1+AddrX (source register R1 not changed and destination register changed from R1 to R2), or R1=R2+AddrX (source register R1 changed to R2 and destination register R1 not changed). Thus, for a broadcast PIM command issued by a host thread that specifies Ri=Ri+AddrX, some PIM execution units use Ri as the local source and destination register while other PIM execution units use R(i+a) or R(i−a) as the local source and/or destination register, where "i" is data that identifies a particular local register and "a" represents an adjustment amount. The alternate local source and destination registers may also be different. In the prior example a PIM execution unit may use R(i+a) or R(i+b) for a local source or destination register, where "b" represents a different adjustment amount from "a". The PIM execution unit 150 could also use this flexibility in selecting registers for other PIM commands executed by the PIM execution unit, e.g. subtract, multiply, etc.

According to an embodiment, split addresses are row specific and are programmed on a per memory module or per bank basis. In this example, the split address provided to the comparator 152 depends upon the particular row that has been activated. If the row-specific split addresses are the same across all banks, then a broadcast PIM command may be used to program the row-specific split addresses. Row and bank-specific split addresses are programmed using separate PIM commands.

According to another embodiment, multiple split addresses may be used per row. Multiple split addresses may be programmed in the same manner as individual split addresses, e.g., on a per memory module or per bank basis. In this example, the PIM execution unit 150 includes another comparator that compares the target address data to a second split address and provides a second comparison result to the source register selector 154 and the destination register selector 156. The source register selector 154 and the destination register selector 156 use the two comparison results and the original local source register select and the original local destination register select, respectively, to 1) determine whether to use the original local source and/or destination register or an alternate local source and/or destination register; and 2) if so, then determine an alternate local source and/or destination register. The programmability capability described herein allows a host thread to dynamically configure, and reconfigure, PIM execution units depending upon the type of work to be performed.

B. Alternate Local Source and/or Destination Registers

Alternate local source and/or destination registers may be determined using several different approaches. According to an embodiment, alternate local source and/or destination registers are specified in the PIM command, for example in unused parameter values. If the source register selector 154 and/or the destination register selector 156 determine, based upon the comparison result from the comparator 152 that an alternate local source register and/or an alternate local destination register should be used to process the PIM command, then the source register selector 154 and/or the destination register selector 156 identify an alternate local source register and/or an alternate local destination register, respectively, from the additional information in the PIM command uses to identify the alternate local source register and/or an alternate local destination register. Multiple alternate local registers may be specified in a PIM command to support implementations with multiple split points.

According to another embodiment, data that identifies one or more alternate local source and/or local destination registers is stored in the memory module and used to select an alternate local source and/or local destination module when the source register selector 154 and/or the destination register selector 156 determine that an alternate local source and/or alternate local destination register should be used. For example, alternate register data that identifies an alternate local source register and an alternate local destination register is stored in local storage within the PIM execution unit 150 or elsewhere in the memory module 120. The alternate register data may be programmed, and reprogrammed, by a host thread. If, for a particular PIM command, the source register selector 154 determines, based upon the comparison result from the comparator 152 that an alternate local source register should be used, then the control signal generated by the source register selector 154 and provided to the multiplexer 164 corresponds to the alternate source register specified in the alternate register data. Similarly, if for a particular PIM command, the destination register selector 156 determines, based upon the comparison result from the comparator 152 that an alternate local destination register should be used, then the control signal generated by the destination register selector 156 and provided to the demultiplexer 158 corresponds to the alternate destination register specified in the alternate register data.

The alternate register data may specify a single alternate source register value and/or a single alternate destination register value. Alternatively, the alternate register data may specify multiple alternate local source and/or local destination register values, e.g., in an alternate local register list. Data, such as a pointer, may be maintained by the PIM execution unit 150 to track the next alternate local source and/or destination register and when a next alternate local source register or a next alternate local destination register is used, the pointer is updated to point to the next alternate local source register or a next alternate local destination register in the alternate local register list in a "round robin" fashion. Separate pointers may be maintained for the alternate local source and destination registers in the alternate register data so that they may be tracked separately.

According to an embodiment, an alternate local source and/or destination register is determined based upon the particular processing logic implemented by the source register selector 154 and/or the destination register selector 156. The processing logic may perform one or more arithmetic operations, such as addition, subtraction, etc., or logical operations, to determine an alternate local source and/or destination register. This may include using local register information specified in a PIM command. For example, the source register selector 154 and/or the destination register selector 156 may be configured to add or subtract a constant value from a source and/or destination register value specified in a PIM command.

Suppose that a particular PIM command specifies a source register of R1, a destination register of R1, an addition operation, and AddrX, i.e., R1=R1+AddrX, to add the value stored at memory location AddrX to the current value stored in the local register R1. In this example upon receiving a comparison result from the comparator 152 that indicates that an alternate local register should be used, the processing logic implemented by the source register selector 154 and/or the destination register selector 156 generates a deterministic alternate register ID by adding a constant value of k to the destination and source register values specified by the particular PIM command, i.e., R(l+k)=R(l+k)+AddrX. The processing logic implemented by the source register selector 154 and/or the destination register selector 156 may be different and one may, for example, perform addition, while the other performs subtraction, or using different constants, etc. Both the local source and local destination registers do not have to be changed. According to an embodiment, the processing logic implemented by the source register selector 154 and/or the destination register selector 156 is programmable. For example, a set of programming commands may be made available to host threads to specify details of the processing logic and/or data used by the processing logic, such as the aforementioned constants.

In situations where the source register selector 154 or the destination register selector 156 determines a local register value that is greater than the available number of local registers, the processing logic is configured to "roll over" the register value to the first local register. For example, suppose that a PIM execution unit has four local registers R0 through R3. Suppose further that the processing logic for the PIM execution unit determines an alternate source or destination register based upon Rj+1, where "j" is the register value specified by a PIM command. In the situation where the value of "j" is three, corresponding to local register R3, the processing logic determines the alternate local register value to be R0 instead of R4, which is not a valid local register value.

Alternate local source and/or destination registers may be identified via a data bus. For example, the alternate register data previously described herein may be transmitted via the data bus 140.

Figure 2A:
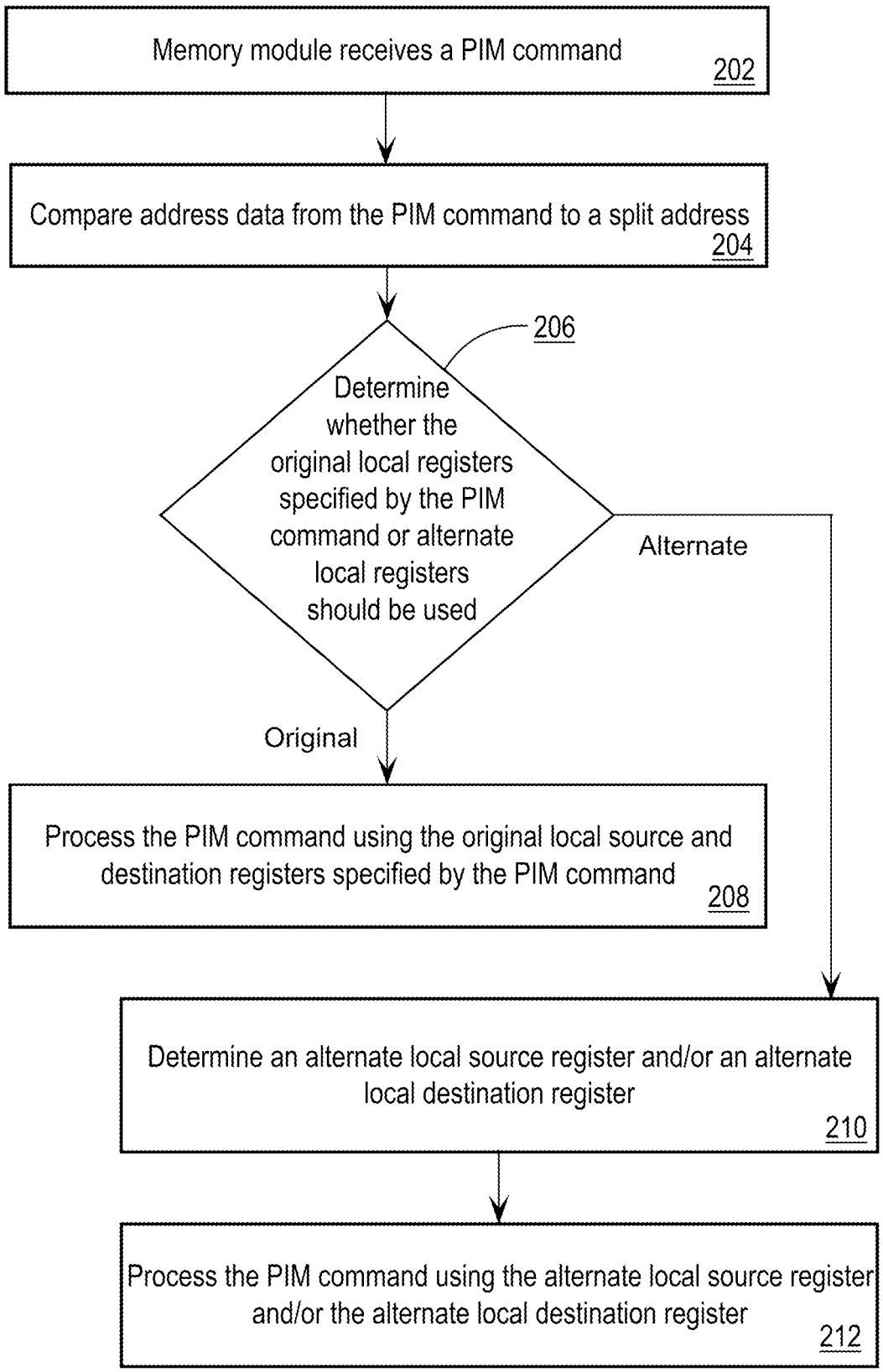
FIG. 2A is a flow diagram that depicts an approach for using a split address maintained by a memory module to determine whether original local registers specified by a PIM command or alternate local registers should be used to process the PIM command.

FIG. 2A is a flow diagram 200 that depicts an approach for using a split address maintained by a memory module to determine whether original local registers specified by a PIM command or alternate local registers should be used to process the PIM command. In step 202, a PIM command is received at a memory module, such as the memory module 120. The PIM command may be a broadcast PIM command for all of the banks in the memory module 120.

In step 204, address data from the PIM command is compared to a split address to generate a comparison result. For example, the comparator 152 compares target address data from the PIM command, such as the column address from a column decoder, to a split address maintained by the memory module 120 and generates a comparison result. The split address may be specific to a particular bank, and corresponding PIM execution unit, or may be common to all banks within the memory module 120. Address data from, i.e., specified by, a PIM command, may be stored, e.g., in a local register, in memory, etc., and then retrieved for the comparison step 204.

In step 206, a determination is made whether the original local registers specified by the PIM command or alternate local registers should be used to process the PIM command. For example, as previously described herein, the source register selector 154 and the destination register selector 156 use the comparison result from the comparator 152 and the original local source and destination registers specified in the PIM command, respectively, to determine whether the original local registers specified by the PIM command or alternate local registers should be used.

If, in step 206 a determination is made that the original local registers specified by the PIM command should be used to process the PIM command, then in step 208, the original local source register and the original local destination register specified by the PIM command are used to process the PIM command.

If, in step 206 a determination is made that the original local registers specified by the PIM command should not be used to process the PIM command, then in step 210, an alternate local source register and/or an alternate local destination register is determined. For example, an alternate local source register and/or an alternate local destination register may be determined as previously described herein. In step 212, the PIM command is processed using the alternate local source register and/or the alternate local destination register.

The process of FIG. 2A may be performed by multiple PIM execution units in parallel, with some of the PIM execution units using the original local source and destination registers specified in the PIM command, while other PIM execution units use an alternate local source and/or destination register determined using the techniques described herein. This eliminates the need for additional command cycles to send separate PIM commands to PIM execution units that need to use different local source and/or destination registers than those specified in the broadcast PIM commands to perform their computations.

IV. REGISTER DATA-BASED REGISTER SELECTION

The register data-based register selection approach generally involves selecting a local source and/or a destination register based upon data stored in local registers used by a PIM execution unit. According to an embodiment, if a register condition is satisfied, then an alternate local source and/or destination register are used instead of the local source and/or destination register specified in a PIM command. The register condition may be represented by any type of operation, such as a compare operation. For example:

If Rx>=Ry then R1=R1+AddrX; else R2=R2+AddrX, where Rx, Ry, R1, R2 are local registers and AddrX is a register address or a memory address and AddrX may be specified by a PIM command. Thus, if the current value stored in the local register Rx is greater than or equal to the current value stored in register Ry, then the value at the location AddrX is added to register R1. Otherwise, the value at the location Addrx is added to register R2.

Embodiments are not limited to comparing the contents of locations using a less than or equal to compare operation and other compare operations may be used, including less than, equal to, greater than or equal to and greater than. Also, embodiments are not limited to comparing the content of a register to the content of another register and the contents of a register may be compared to the contents of a memory location. For example, if Rx>=AddrY then R1=R1+AddrX; else R2=R2+AddrX, where AddrY is a memory location.

The registers and/or memory location(s) used to determine whether a register condition is satisfied, e.g., Rx, Ry, AddrY in the prior examples, may be designated for use with the register data-based register selection approach. Alternatively, the registers and/or memory location(s) may be in the set of registers used to process PIM commands. The registers and/or memory location(s) may be programmed in the same manner as previously described herein in the address data-based register selection approach. For example, a thread may issue a special command that specifies the register IDs of the two registers, or a register ID and a memory address, to be used in the comparison. According to an embodiment, the registers and/or memory location(s) used to determine whether a register condition is satisfied may be selected based upon the result of a prior instruction, e.g., the prior instruction setting a flag that is used to select the registers and/or memory location(s).

In addition, the contents of the registers and/or memory location(s) may also be programmed by a thread. For example, in the prior example compare operation of: If Rx>=Ry then R1=R1+AddrX; else R2=R2+AddrX, the contents of Rx and Ry may be programmed by a thread to achieve a particular result for work being performed. That thread, or another thread, may later change the contents of the registers and/or memory location(s) prior to performing a different type of work. The registers and/or memory location(s) designated for use in the comparison may be pre-designated and a thread only needs to send the values to be used in the comparison. For example, suppose that registers R1 and R3 are designated to be used in the comparison, i.e., if R1>=R3. A thread issues a special command to specify the values for register R1 and R3 and the specified values are stored in the registers. The values are then used during PIM command processing to determine whether the original local source and/or destination register specified in the PIM command or an alternate local source and/or destination register should be used, as previously described herein.

Figure 1D:
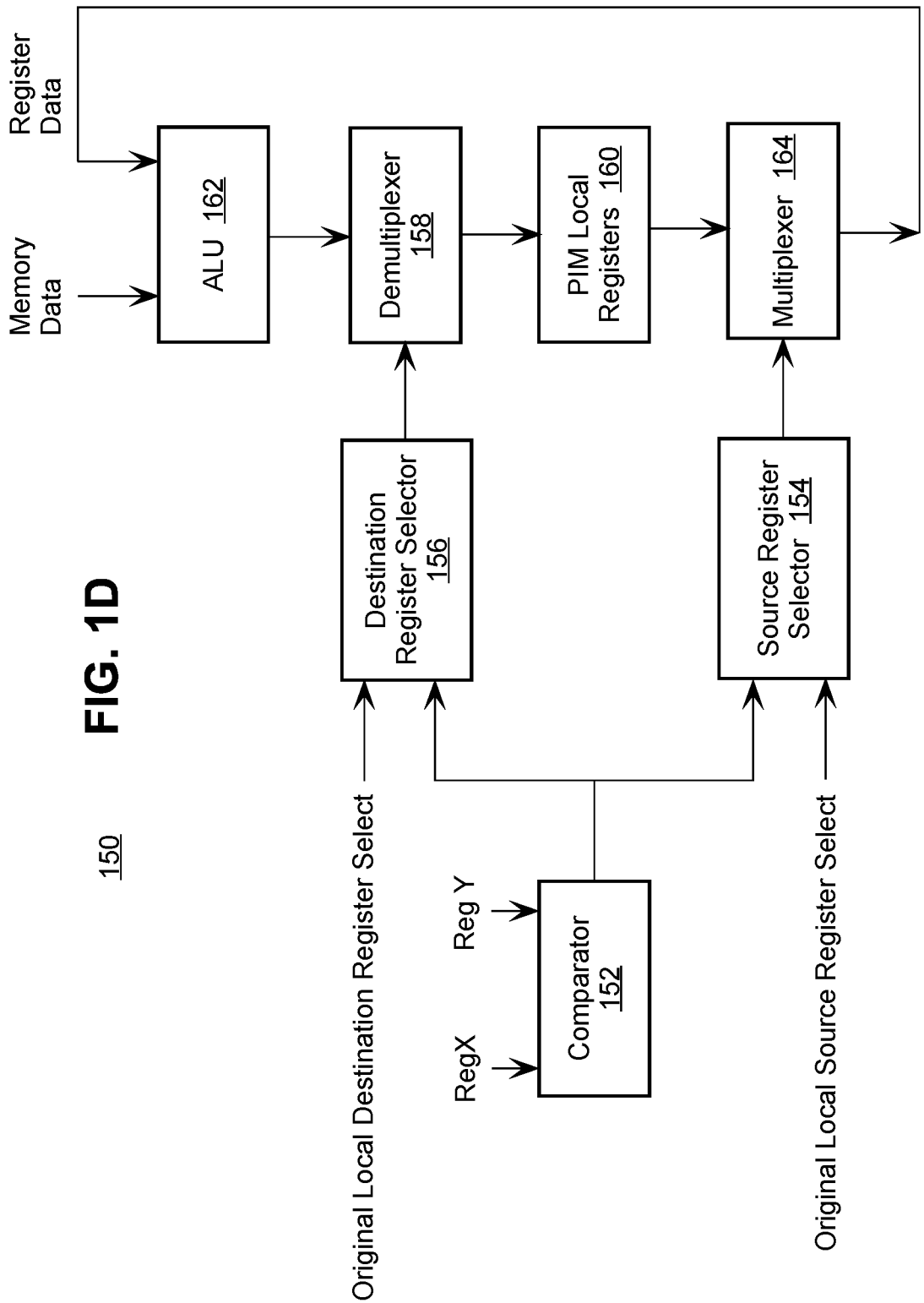
FIG. 1D depicts another example implementation of a PIM execution unit.

FIG. 1D depicts an example implementation of the PIM execution unit 150 from FIG. 1C, except that the inputs to the comparator 152 are the contents of registers X and Y, i.e., RegX and RegY. If the comparator 152 implements a less than or equal to comparison, then then the comparison result generated by the comparator 152 is a logical "1" if the value in register X is less than or equal to the value in register Y, and a logical "0" otherwise. Alternate local source and/or destination registers are selected in the same manner as previously described herein with respect to the address data-based register selection approach.

Embodiments are not limited to the example implementations of the PIM execution unit 150 depicted in FIGS. 1C and 1D. For example, according to an embodiment, the ALU 162 is used instead of the comparator 152 to perform the comparison of the target address data and the split address in FIG. 1C and the comparison of the contents of registers RegX and RegY in FIG. 1D. The comparison result is provided by the ALU 162 to the source register selector 154 and the destination register selector 156. Alternatively, the comparison result may be stored in a one-bit register as a flag and the flag used by the source register selector 154 and the destination register selector 156.

FIG. 2B is a flow diagram 250 that depicts an approach for using the contents of local registers in a memory module to determine whether original local registers specified by a PIM command or alternate local registers should be used to process the PIM command. In step 252, a PIM command is received at a memory module, such as the memory module 120. The PIM command may be a broadcast PIM command for all of the banks in the memory module 120.

In step 254, the contents of a local register are compared to the contents of another local register or a memory address. For example, the contents of register Rx are compared to the contents of register Ry.

In step 256, a determination is made whether the original local registers specified by the PIM command or alternate local registers should be used to process the PIM command. For example, as previously described herein, the source register selector 154 and the destination register selector 156 use the comparison result from the comparator 152 and the original local source and destination registers specified in the PIM command, respectively, to determine whether the original local registers specified by the PIM command or alternate local registers should be used. The comparison result may indicate, for example, whether the contents of register Rx are less than or equal to register Ry, i.e., whether Rx<=Ry. As previously described, other comparison operations, such as equal to, greater than or equal to, or greater than, may be used and the contents of a register may be compared to the contents of another register, e.g., Ry, or the contents of a memory address, e.g., AddrY. In addition to comparison operations, logical operations may be applied to the contents of registers and/or memory locations to determine whether the original local registers specified by the PIM command or alternate local registers should be used to process the PIM command.

If, in step 256 a determination is made that the original local registers specified by the PIM command should be used to process the PIM command, then in step 258, the original local source register and the original local destination register specified by the PIM command are used to process the PIM command.

If, in step 256 a determination is made that the original local registers specified by the PIM command should not be used to process the PIM command, then in step 260, an alternate local source register and/or an alternate local destination register is determined. For example, an alternate local source register and/or an alternate local destination register may be determined as previously described herein. In step 262, the PIM command is processed using the alternate local source register and/or the alternate local destination register.

As with the process of FIG. 2A, the process of FIG. 2B may be performed by multiple PIM execution units in parallel, with some of the PIM execution units using the local source and destination registers specified in the PIM command, while other PIM execution units use an alternate local source and/or destination register using the techniques described herein. This eliminates the need for additional command cycles to send separate and unique PIM commands to PIM execution units that need to use different local source and/or destination registers to perform their computations.

Although embodiments are described herein in the context of PIM-enabled memory modules for purposes of explanation, embodiments are applicable to other contexts, such as Single Instruction Multiple Data (SIMD)-like architectures to allow the same instruction to operate on different data using different registers. In the case of thread divergence for example, when the "if" and "else" statements include the same instructions with different register IDs, this can help hardware lanes executing a wavefront make progress on different instructions simultaneously.

The invention claimed is:

1. A memory module comprising:
one or more memory cells, wherein
the memory module is configured to:
select a local register for a memory command being executed by the memory module by:
comparing first address data specified by the memory command and second address data maintained by the memory module; and
based on the comparing, selecting a first register specified by the memory command as the local register in response to a first comparison result and selecting an alternate register as the local register in response to a second comparison result.

2. The memory module of claim 1, wherein the local register is a local source register for the memory command.

3. The memory module of claim 1, wherein the local register is a local destination register for the memory command.

4. The memory module of claim 1, wherein the memory module is further configured to in response to the second comparison result, select the alternate register as the local register for the memory command based on alternate register data stored in the memory module that specifies the alternate register.

5. The memory module of claim 1, wherein the memory module is further configured to in response to the second comparison result, determine the alternate register based upon a local source register or a local destination register specified by the memory command.

6. The memory module of claim 5, wherein determining the alternate register includes incrementing or decrementing one or more of a local source register identification value or a local destination register identification value specified by the memory command.

7. The memory module of claim 1, wherein:
the memory command is a Processor-In-Memory (PIM) command, and
the alternate register is different than a local source register or a local destination register specified by the PIM command.

8. A memory module comprising:
one or more memory cells, wherein
the memory module is configured to select a local register for a memory command being executed by the memory module based upon results of comparing first contents of a first register of the memory module and second contents of the memory module.

9. The memory module of claim 8, wherein
the second contents of the memory module comprise contents of a second register of the memory module or contents of a memory location in the memory module.

10. The memory module of claim 8, wherein the memory module is further configured to select the local register by:
selecting a first register specified by the memory command as the local register in response to a first comparison result; and
selecting an alternate register as the local register in response to a second comparison result.

11. The memory module of claim 10, wherein the alternate register is selected as the local register based on alternate register data stored in the memory module that specifies the alternate register.

12. The memory module of claim 10, wherein the memory module is further configured to in response to the second comparison result, determine the alternate register based upon a local source register or a local destination register specified by the memory command.

13. The memory module of claim 12, wherein determining the alternate register includes incrementing or decrementing one or more of a local source register identification value or a local destination register identification value specified by the memory command.

14. The memory module of claim 10, wherein:
the memory command is a Processor-In-Memory (PIM) command, and
the alternate register is different than a local source register or a local destination register specified by the PIM command.

15. A method comprising:
determining, for a memory command being executed by a memory module, a local register that is local to the memory module by:
comparing first address data specified by the memory command and second address data maintained by the memory module; and
based on the comparing, selecting a first register specified by the memory command as the local register in response to a first comparison result and selecting an alternate register as the local register in response to a second comparison result; and
causing the memory command to be processed at the memory module using the local register.

16. The method of claim 15, wherein the local register is a local source register for the memory command.

17. The method of claim 15, wherein the local register is a local destination register for the memory command.

18. The method of claim 15, further comprising in response to the second comparison result, selecting the alternate register as the local register for the memory command based on alternate register data stored in the memory module that specifies the alternate register.

19. The method of claim 15, further comprising in response to the second comparison result, determining the alternate register based upon a local source register or a local destination register specified by the memory command.

20. The method of claim 19, wherein determining the alternate register includes incrementing or decrementing one or more of a local source register identification value or a local destination register identification value specified by the memory command.

* * * * *